US 6,702,967 B2

(12) United States Patent
Overholt et al.

(10) Patent No.: US 6,702,967 B2
(45) Date of Patent: Mar. 9, 2004

(54) PROCESS FOR PREPARING DECORATIVE SURFACE MATERIALS HAVING A DECORATIVE PATTERN

(75) Inventors: Allan R. Overholt, Lancaster, NY (US); William P. Paplham, Getzville, NY (US); Rolf T. Weberg, East Aurora, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 325 days.

(21) Appl. No.: 09/916,605

(22) Filed: Jul. 27, 2001

(65) Prior Publication Data

US 2003/0026949 A1 Feb. 6, 2003

(51) Int. Cl.⁷ .............................................. B29C 43/20
(52) U.S. Cl. .................... 264/77; 264/108; 264/110; 264/118; 264/119; 264/152; 264/247; 264/248; 264/320
(58) Field of Search ............................ 264/77, 108, 110, 264/118, 119, 247, 320, 248, 152, 245

(56) References Cited

U.S. PATENT DOCUMENTS

| | | | | |
|---|---|---|---|---|
| 4,137,215 A | * | 1/1979 | Van Gasse | .................. 523/171 |
| 4,239,820 A | | 12/1980 | Salvador | |
| 4,405,539 A | * | 9/1983 | Schulte et al. | ................. 264/77 |
| 5,055,327 A | | 10/1991 | Baskin | |
| 5,154,868 A | * | 10/1992 | Heckel et al. | ............... 264/162 |
| 5,166,230 A | * | 11/1992 | Stecker | ........................ 523/500 |
| 5,766,334 A | * | 6/1998 | Hashizume et al. | ........ 106/403 |
| 6,040,045 A | | 3/2000 | Alfonso et al. | |
| 6,203,911 B1 | | 3/2001 | Weberg et al. | |
| 6,398,999 B1 | * | 6/2002 | Josephy et al. | ................ 264/81 |

FOREIGN PATENT DOCUMENTS

| | | |
|---|---|---|
| EP | 0 267 409 A1 | 5/1988 |
| EP | 0 536 988 A2 | 4/1993 |
| EP | 0 755 764 A1 | 1/1997 |
| EP | 0 873 837 | 10/1998 |
| FR | 1 511 615 | 2/1968 |
| FR | 2 348 950 | 11/1977 |
| WO | WO 98-27131 | 6/1998 |
| WO | WO 98-38244 | 9/1998 |

* cited by examiner

Primary Examiner—Edmund H. Lee

(57) ABSTRACT

Decorative surface material having a decorative pattern in which a combination of domains of varying sizes and colors are defined by shading variations at the interfaces of adjoining domains, the decorative pattern being provided by a process in which a flowable thermosettable molding formulation having orientable particles mixed therein is divided into fragments which are mixed together, the mixture is fed into a hot mold and pressure is applied to form the solid surface material.

14 Claims, No Drawings

PROCESS FOR PREPARING DECORATIVE SURFACE MATERIALS HAVING A DECORATIVE PATTERN

BACKGROUND OF THE INVENTION

1. Field of the Invention

This invention relates to molding formulations that are fabricated into decorative surface materials, which have unique decorative patterns.

2. Description of the Related Art

Solid surface materials are essentially non-porous composites of finely divided mineral fillers dispersed in an organic polymer matrix. Examples of commonly used fillers include alumina trihydrate, calcium carbonate, silica, and alumina. Examples of commonly used thermoset polymeric materials include acrylic, polyester, melamine, urethane, acrylo-urethane, epoxy resins and combinations thereof. Most solid surface materials are manufactured by thermoset processing, such as sheet casting, cell casting, injection molding, or bulk molding. The decorative qualities of such products are greatly enhanced by incorporating pigments and colored particles such that the composite resembles natural stone. The range of patterns commercially available is constrained by the intermediates and processes currently used in the fabrication of such materials.

Solid surface materials in their various applications serve both functional and decorative purposes. Since incorporating various attractive and/or unique decorative patterns enhances their utility, such patterns constitute intrinsically useful properties, which differentiate one product from another. The same principle applies to naturally occurring materials such as wood or stone whose utility, for example in furniture construction, is enhanced by certain naturally occurring patterns, e.g., grain, color variations, veins, strata, inclusions, and others. Commercially manufactured solid surface materials often incorporate decorative patterns intended to imitate or resemble the naturally occurring patterns in granite or marble. However, due to limitations of feasibility and/or practicality, certain decorative patterns and/or categories of decorative patterns have not previously been incorporated in solid surface materials.

Decorative patterns have been previously achieved in traditional thermoset fabrication primarily by the following three methods:

(i) Monochromatic or polychromatic pieces of a pre-existing solid surface product are mechanically ground to produce irregularly shaped colored particles, which are then combined with other ingredients in a new thermoset formulation. Curing the reaction combination during casting or molding produces a solid surface material in which colored inclusions of irregular shapes and sizes are surrounded by, and embedded in a continuous matrix of different color.

(ii) During casting of a thermoset reaction combination, a second reaction combination of a different color is added in such a way that the two only intermix to a limited degree. In the resulting solid surface material, the different colored domains have smooth shapes and are separated by regions with continuous color variation.

(iii) Different colored solid surface products are cut or machined into various shapes, which are then joined by means of adhesive to create multi-colored inlayed patterns or designs.

Using these traditional thermoset methods it is not possible to produce certain categories of decorative patterns, which occur in natural stone.

Moreover, the inclusions incorporated in solid surface products produce; by method (i) are limited to sizes less than about 20 mm, more generally less than 5 mm, and must constitute less than about 80% of the thermoset reaction mix, more generally less than 20%.

SUMMARY OF THE INVENTION

This invention is directed to decorative surface materials having unique decorative patterns and categories of patterns not previously represented. The present invention comprises a decorative pattern in which a multiplicity of domains derived from thermoset molding of fragments of thermosettable molding formulations exhibiting different shading at the domain interfaces provided by different orientations of orientable anisotropic aesthetic-enhancement particles within the domains. As used herein, a domain comprises visibly distinct regions within the final product that correspond to the original individual charge fragments. In addition, further, more significant, changes in shading occur at interfaces, i.e. knit regions, between the domains due to flow orientation of the aesthetic-enhancement particles during processing or concentration gradients of the aesthetic-enhancement particles in other regions of the domain. The changes in appearance due to concentration gradients may occur in conjunction or independently of the presence of aesthetic-enhancement particles.

Incorporation of orientable anisotropic aesthetic-enhancement particles into the formulation allows the creation of additional aesthetics. By anisotropic it is meant having different physical properties in different directions, e.g. having an appearance that varies depending on the angle of observation. The particles should have an aspect ratio of at least 3. It will be apparent that the patterns in the decorative surface materials of this invention are three dimensional and distinct from patterns obtained by applying decals, appliques and paint to a surface. These particles have an aspect ratio that is high enough that the particles tend to become aligned with material flow directions when processed. The aspect ratio is the length of a particle divided by its diameter, or stated differently, its largest dimension divided by its smallest dimension. These particles also have a different aesthetic effect when aligned at various angles relative to the material surface and to the viewer. These effects may be due to angle dependent reflectivity, angle dependent color absorption/reflection, or visible shape. Examples of these aesthetic-enhancement particles include, but are not limited to minerals (mica, alumina, silica, etc.), glasses, ceramics, polymers or other natural or synthetic substrates coated with various materials (minerals, dyes, etc.) for reflectivity, interference patterns or selective color absorption. Fibers, films, and ribbons also present a different appearance depending on the angle of observation.

These anisotropic particles tend to orient during the processing of the molding formulation. The degree of orientation will depend on the methods of mixing and further processing. During mixing, the particles will tend to orient on a localized basis (providing the optical effect), but the over all orientation in the bulk of the material will be somewhat chaotic due to the complicated flow patterns during mixing. Additional processing, such as extrusion, may further align the particles on both a local and overall basis. When the formulation is chopped, ground, extruded, or by some other means fragmented into smaller masses (i.e. charge fragments) this orientation is retained. When these charge fragments are arranged either by a random or selective process in a mold and pressed, some of the anisotropic particles retain their original orientation, while some are reoriented by material flow in the mold. The degree of reorientation depends on the amount of flow experienced by that particle. This creates an aesthetic where the individual charge fragments all vary slightly in appearance due to the different general orientation of the anisotropic aesthetic-enhancement particles relative to the surface of the material and to the observer. In areas of greater flow, particularly in the area between charge fragments where the fragments contact each other and there is a change in the predominate direction of material flow, this effect is more pronounced, creating a more visible change in appearance.

Another method of enhancing the appearance is by incorporating more than one flowable thermosettable molding formulation, either as a partial blend or a mixture of molding formulations. The two formulations can have complimentary or contrasting aesthetics, depending on the desired effect. In the final product each domain will have shade variations and knit regions due to flow and aesthetic particle orientation, with the additional contrast of the two formulations.

The appearance of a decorative surfacing material made from the process of the invention can be further enhanced by coating the surfaces of the charge fragments with solids or liquids that provide additional contrast at the edges of the charge fragments. The solids or liquids become an integral part of the solid surface article when the interfaces of the charge fragments are fused in the molding process.

Sizes of the charge fragments are limited only by the mold design limitations on the high end and down to a powder on the small end.

The effect of the anisotropic aesthetic-enhancement particles is visible at levels as low as 0.01% by weight of the charge fragments when other colorants or fillers are absent. The amount of anisotropic aesthetic-enhancement particles required to give a visible pattern increases as fillers or other colorants are added. Additional levels of anisotropic enhancement particles increase the intensity of patterns. The level at which the particles may be added is only limited by practical limitations such as cost and processability.

In forming a decorative surface material a compression molding technique is preferred; however transfer and injection molding may be used.

DETAILED DESCRIPTION OF THE INVENTION

Starting molding formulations can be made by a process in which molding formulations are made and processed as described in Weberg et al, U.S. Pat. No. 6,203,911 B1. Orientable anisotropic aesthetic-enhancement particles are included in the molding formulations as described hereinafter. The molding formulations are cut, chopped, or ground into pieces to provide a mixture of charge fragments with a given particle size distribution. The charge fragments are fed to a hot mold and pressure is applied to cure the molding formulation, forming a decorative surface material. Elevated temperatures and pressures, i.e. above ambient are used. The charge fragments can be fed in such a manner that the orientations of the particles are either controlled or random. During the molding operation, flow and further orientation of the aesthetic-enhancement particles occurs. This is particularly noticeable at interfaces, i.e. knit regions formed between the charge fragments where they meet and fuse during compression. Anisotropic pigments, reflective particles, fibers, films and finely divided solids (or dyes) may be used as the aesthetic-enhancement particles in the charge fragments to highlight fragment orientation effects and knit regions. By controlling the amount of enhancement particles, shape and the size of charge fragments, the density of the interface, i.e. knit pattern can be manipulated to give a desired aesthetic. Different colors, reflectivities, and translucencies of charge fragments can be achieved by combining different amounts of enhancement particles, fillers, and colorants. Depending on the decorative effect desired, fillers, colorants, and enhancement particles may be omitted from some of the charge fragments.

Thermosettable materials useful in the present invention are not specifically limited as long as they can be formed into charge fragments, are flowable under molding conditions and can be formed into a solid surface material. Useful thermosettable materials include acrylics, polyesters, epoxies, urethanes, acrylo-urethanes, melamines and combinations thereof.

Examples of acrylic materials include various kinds of conventional acrylic group monomers, acrylic group partial polymers, vinyl monomers for copolymerization other than acrylic group monomers, or oligomers. As the acrylic group monomer, (meth)acrylic ester is preferable. Also, in this specification, "(meth)acrylic" means "acrylic and/or methacrylic". A particularly good and especially preferred monomer is methyl methacrylate (MMA) while a particularly good and especially preferred polymer is poly(methyl methacrylate) PMMA.

Other monomers useful as polymerizable constituents are alkyl acrylates and methacrylates in which the alkyl groups can be from 1–18 carbon atoms, but preferably 1–4 carbon atoms. Suitable acrylic monomers are methyl acrylate; ethyl acrylate and methacrylate; n-propyl and i-propyl acrylates and methacrylates; n-butyl, 2-butyl, i-butyl and t-butyl acrylates and methacrylates; 2-ethylhexyl acrylate and methacrylate; cyclohexyl acrylate and methacrylate; omega-hydroxyalkyl acrylates and methacrylates; N,N-dialkylaminoalkyl acrylates and methacrylates; N-[t-butyl] aminoethyl acrylate and methacrylate.

Other unsaturated monomers include styrene; bis-[beta-chloroethyl] vinylphosphonate; vinyl acetate; α-methylenebutyrolactone (MBL); acrylonitrile; methacrylonitrile; acrylic and methacrylic acids; 2-vinyl- and 4-vinyl pyridines; maleic acid, maleic anhydride and esters of maleic acid; acryl amide and methacrylamide; itaconic acid, itaconic anhydride and esters of itaconic acid and multifunctional monomers for cross-linking purposes such as unsaturated polyesters: alkylene diacrylates and dimethacrylates; allyl acrylate and methacrylate; N-hydroxymethylacrylamide and N-hydroxymethylmethacryl-amide; N,N'-methylene diacrylamide and dimethacrylamide; glycidyl acrylate and methacrylate; diallyl phthalate; divinylbenzene; divinyltoluene; trimethylol-propane, triacrylate and trimethacrylate; pentaerythritol tetraacrylate and tetramethacrylate; triallyl citrate and triallyl cyanurate.

Thermosettable formulations containing anisotropic aesthetic-enhancement particles could also include various thermoplastic resins capable of compression molding. In this case the anisotropic aesthetic-enhancement particles have an existing orientation from thermoplastic processing. The thermoplastic formulation containing the anisotropic aesthetic-enhancement particles would be added to the thermosettable formulation. During molding of the part further orientation of the anisotropic aesthetic-enhancement particles could occur due to material flow.

Particles of previously thermoset compositions containing oriented aesthetic-enhancement particles could also be incorporated in the flowable thermosettable molding formulation. In this case the aesthetic-enhancement particles would be immobile within the larger thermoset particle, but the larger thermoset particle could orient during molding thus changing the orientation of the aesthetic-enhancement particles within.

Preferred aesthetic-enhancement particles include materials that have an aspect ratio that is sufficiently high to promote particle orientation during material processing and also have an appearance that changes relative to the orientation to the material and the observer. The aspect ratios of suitable enhancement particles cover a broad range, e.g. aluminum flakes (20–100), mica (10–70), milled glass fiber (3–25), aramid fiber (100–500), chopped carbon fiber (800), chopped glass fiber (250–800) and milled coated carbon fiber (200–1600). These visual effects may be due to angle dependent reflectivity, angle dependent color absorption/reflection, or visible shape. These particles may be plate-like, fibers, or ribbons. The particles should have a minimum aspect ratio of three. Plate-like materials have two dimensions significantly larger than the third dimension. Examples of plate-like materials include, but are not limited to: mica, synthetic mica, glass flakes, metal flakes, alumina and silica substrates, polymer film flakes, as well as synthetic materials such as ultra-thin, multi-layer interference flakes (e.g., Chromaflair® from Flex Products), and helical superstructure, cigar-shaped liquid crystal molecules (e.g., Helicone® HC from Wacker). In many cases the surfaces of the platy substrate are coated with various metal oxides or pigments to control color and light interference effects. Some materials appear to be different colors at different angles.

Fibers have one dimension that is significantly larger than the other two dimensions. Examples of fibers include, metal, polymer, carbon, glass, ceramic, and various natural fibers.

Ribbons have one dimension that is significantly larger than the other two, but the second dimension is noticeably larger than the third. Examples of ribbons would include metals and polymer films.

By varying the amounts of the volatile components in the liquid phase, migration of fine particles such as pigments and fillers can be controlled. Increasing the amount of volatile components will increase the amount of migration of the particles.

Optionally, the molding formulations may include particulate or fibrous fillers that are either not isotropic or not aesthetic. In general, fillers increase the hardness, stiffness or strength of the final article relative to the pure polymer or combination of pure polymers. It will be understood, that in addition, the filler can provide other attributes to the final article. For example, it can provide other functional properties, such as flame retardation, or it may serve a decorative purpose and modify the aesthetic. Some representative fillers include alumina, alumina trihydrate (ATH), alumina monohydrate, aluminum hydroxide, aluminum oxide, aluminum sulfate, aluminum phosphate, aluminum silicate, Bayer hydrate, borosilicates, calcium sulfate, calcium silicate, calcium phosphate, calcium carbonate, calcium hydroxide, calcium oxide, apatite, glass bubbles, glass microspheres, glass fibers, glass beads, glass flakes, glass powder, glass spheres, barium carbonate, barium hydroxide, barium oxide, barium sulfate, barium phosphate, barium silicate, magnesium sulfate, magnesium silicate, magnesium phosphate, magnesium hydroxide, magnesium oxide, kaolin, montmorillonite, bentonite, pyrophyllite, mica, gypsum, silica (including sand), ceramic microspheres, ceramic particles, ceramic whiskers, powder talc, titanium dioxide, diatomaceous earth, wood flour, borax, or combinations thereof.

Furthermore, the fillers can be optionally coated with sizing agents, for example, silane (meth)acrylate which is commercially available from OSI Specialties (Friendly, VN) as Silane 8 Methacrylate A-174. The filler is present in the form of small particles, with an average particle size in the range of from about 5–500 microns, and can be present in amounts of up to 65% by weight of the molding formulations.

The nature of the filler particles, in particular, the refractive index, has a pronounced effect on the aesthetics of the final article. When the refractive index of the filler is closely matched to that of the polymer component, the resulting final article has a translucent appearance. As the refractive index deviates from that of the polymer component, the resulting appearance is more opaque. Because the index of refraction of ATH is close to that of PMMA, ATH is often a preferred filler for PMMA systems. Of particular interest are fillers with particle size between 10 microns and 100 microns. Alumina ($Al_2O_3$) improves resistance to marring. Fibers (e.g., glass, nylon, aramid and carbon fibers) improve mechanical properties. Examples of some functional fillers are antioxidants (such as ternary or aromatic amines, Irganox® (Octadecyl 3,5-Di-(tert)-butyl-4-hydroxyhydrocinnamate) supplied by Ciba Specialty Chemicals Corp., and sodium hypophosphites, flame retardants (such as halogenated hydrocarbons, mineral carbonates, hydrated minerals, and antimony oxide), UV stabilizers (such as Tinuvin® supplied by Ciba Geigy), stain-resistant agents such as Teflon®, stearic acid, and zinc stearate, or combinations thereof.

The formulation can optionally include fillers for decorative purposes. Such fillers, although they may have a minor effect on physical properties, are present primarily for aesthetic reasons. Examples of suitable decorative fillers include pigments and other water-insoluble colorants, rocks, colored glass, colored sand of various sizes, wood products, such as fibers, pellets and powders, ground polymer, ground solid surface materials, and others. The particle size will vary with the nature of the decorative filler and can be as small as sub-micron or as large as several centimeters.

It is permissible to include minor amounts of additives such as dyes, parting agents, fluidizing agents, viscosity control agents, curing agents, antioxidants, and the like, as are known to those of ordinary skill in the art, as long as they do not detract from the mechanical properties of the invention.

In carrying out the process of this invention, solids such as anisotropic orientable particles, colorants, and other fillers may be premixed prior to adding liquid ingredients to a mixer. After adding liquid ingredients, mixing is terminated when the formulation thickens and becomes a homogenous tough dough forming a thermosettable molding formulation that is flowable under the selected molding conditions. This formulation can be partially mixed with other molding formulations or used alone. The molding formulation is then cut, chopped, torn, extruded, or ground mechanically into charge fragments of the desired size, dispersity, and morphology. Under normal handling conditions the fragments retain their shape. The size of charge fragments can vary from very small (2–3 mm) to large (50–100 cm).

Aesthetic-enhancement containing charge fragments can be mixed with charge fragments from other molding formulations to create a final charge mass. Two or more formulations may be co-ground/chopped/cut into fragments, with mixing occurring during the grinding operation.

In addition to containing orientable anisotropic aesthetic-enhancement particles the charge fragments may also be coated with colorants, which may be single components or mixtures, which provide a visual contrast to the charge fragments. For example, the fragments may be coated in a pigment, such as mica or titanium dioxide, which are in a solid form. Or the fragments can be coated with a polymerizable powder, one example of which would be a powder that is similar in composition to the molding formulation. Or the fragments can be rolled in a polymerizable liquid composition, an example of which is a mixture consisting of methyl methacrylate, a urethane diacrylate, a cross-linker, mica and a polymerization initiator.

The charge fragments are then placed in a hot mold and molded as known in the art. Molding temperatures will vary depending on the particular resins and initiators being used. Optionally, different surface textures such a roughness, granularity, graining, patterning, and the like may be added. A sample method is employing mold surfaces with textures that transfer to the molding formulation and are retained upon thermosetting of the formulation.

Decorative surface materials of this invention can be prepared by compression molding or transfer and injection molding techniques, which are known in the art. Suitable molding apparatus is available commercially. Robust equipment, e.g. mixers, cutters, and grinders must be used in view of the extremely high viscosity of the molding formulations.

The invention can be more fully understood by reference to the following examples. In the following examples all parts and percentages are by weight, and degrees in centigrade, unless otherwise indicated.

EXAMPLES

Example 1

This example describes the preparation of a decorative surfacing material, which contains mica as an anisotropic orientable particle, red and/or yellow iron oxide pigment, and alumina trihydrate as filler. Two preparations of Liquid Premix and Dry Blend were made. The formulations are made independently for later combination. For a single color preparation all the steps are the same, but only one formulation is used when making the charge fragments.

Formulation Preparation for Two Formulations for Blending
  Weigh the following ingredients:
  1120 grams ATH (alumina trihydrate) from Alcan
  401 grams Paraloid® Latex K120ND (poly(methyl methacrylate/ethyl acrylate) polymer particle setting agent) from Rohm & Haas
  6 grams Zinc Stearate
  40 grams Afflair® 500 Bronze Mica
  361 grams Methyl methacrylate (MMA)
  57.8 grams Ethylene glycol dimethacrylate (EGDMA)
  6.92 grams Luperox® 575 (t-Amyl peroxy-2-ethyl hexanoate) thermal initiator from Atofina
  1.13 grams Vazo® 67, 2,2'-azobis(methylbutyronitrile) thermal initiator from DuPont
  1.68 grams Zelec® MO coupling agent from DuPont
  4 grams pigment dispersion (either Red Oxide or Yellow Iron Oxide)

Liquid Premix
  A liquid premix is prepared by combining the MMA, EGDMA, and Zelec® MO in a small vessel and mixing them with an impeller driven by an air motor for 2 minutes to mix them evenly:
  Luperox® 575 and Vazo® 67 are then added and mixed for 10 minutes to mix fully and ensure the Vazo® 67 is fully dissolved.
Dry Blending
  A mixture of the solids is then prepared by dry blending the ATH, Paraloid®, and Zinc Stearate in a Charles Ross and Sons Company Double Planetary Mixer (Model LDM-2) equipped with high viscosity mixing blades. The ingredients are blended for 5 minutes after which 40 grams of Afflair® 500 Bronze mica is added to the mixed solids.
Compounding
  4 grams of red iron oxide (yellow iron oxide for the second color) pigment dispersion were added to the ingredients of the Double Planetary Mixer (DPM). The liquids from the Liquid Premix were then added and the mixture was blended for 6 minutes beyond the point where the ingredients coalesced into a cohesive formulation. The cohesive mass was then removed from the mixer and sealed in a container, which was impervious to MMA. (In a separate procedure the above steps were repeated using 4 grams of yellow iron oxide instead of the red iron oxide.)
Preparation of Mold Charge
Rest Period
  The molding formulation from the previous step is allowed to rest for a minimum of one hour to allow additional adsorption of the MMA into the latex particles.
Fragment Formation
  For a two color formulation, 2000 grams of each color of molding formulation was weighed out. (In the case of single color preparation, the entire cohesive mass is used.)
  Add the cohesive mass to the DPM and mix at a mixer speed of 2. The blades begin to break up the now stiffer molding formulation. Mixing is continued until all the particles are 1 cm or less in diameter.
  Seal the fragments in a container impervious to MMA until ready for molding.
Molding
  900 grams of the fragments from the previous step were poured into an 8"×8" plaque mold (preheated to 122° C.). The fragments were evenly distributed in the mold. The mold was closed and 1480 psig (102 bar) pressure was applied for 8 minutes to cure the part. With the application of pressure and heat the surfaces of the fragments in the heated mold fused together and the formulation cured to give a solid surface part. The mold was then opened and the part removed.
  The part as molded has a very thin surface layer of mica which is highly oriented parallel to the surface of the part. When lightly sanded a surface representative of the bulk of the material was revealed.
  The resulting part is an attractive red-brown with an obvious visual texture. On close examination, two different colors may be seen. There are also many fine lines separating domains of similar or different colors. Within the individual regions of a single color there are also slight variations in color.
  Microscopic examination reveals orientation of mica particles along the lines separating domains.

Example 2

This example describes the preparation of a decorative surfacing material, which contains mica as an anisotropic orientable particle, with no additional fillers or colorants Weigh the following ingredients:
1390 grams Elvacite® poly(methyl methacrylate) from ICI Acrylics
100 grams Paraloid® Latex K120ND from Rohm & Haas
6 grams Zinc Stearate
5 grams mica Afflair® 9502 Red-Brown
423 grams MMA
67.67 grams EGDMA
7.19 grams Luperox® 575
1.18 grams Vazo® 67

Liquid Premix

The MMA and EGDMA are added to a small vessel and mixed with an impeller driven by an air motor for 2 minutes to mix evenly.

The Luperox® 575 and Vazo® 67 are added, and the mixture is mixed fully for 10 minutes to ensure the Vazo® 67 is fully dissolved.

Dry Blending

The first three ingredients (Elvacite®, Paraloid®, and Zinc Stearate) are placed in the DPM and blended for 5 minutes to mix the dry ingredients. The mica was then added to the dry ingredients after mixing is complete.

Compounding

The liquid ingredients from the premix step were added to the DPM and blended at a mixer speed of 2 for six minutes. At this point the mixture was very viscous. The viscous mass was removed from the mixer and sealed in a container impervious to MMA.

Preparation of the Mold Charge

Rest Period

The viscous mass was allowed to rest for one hour to permit additional adsorption of the MMA into the latex and Elvacite®.

Particle Formation

The formulation was cut into fragments, which were roughly cubic in shape and 1–3 cm in size. The fragments were sealed in a container impervious to MMA until ready for molding.

Molding 625 grams of the fragments from the previous step were poured into an 8"x8" plaque mold (preheated to 122° C.). The fragments were evenly distributed in the mold. The mold was closed and 1480 psig (102 bar) pressure was applied for 8 minutes to cure the part.

The resulting sample had distinct delineations between the originally separate fragments. This delineation at the former interface appears darker than the bulk of the material. Within each formerly individual fragment variations in color may be seen. It is apparent where edges of fragments were prior to molding due to changes in appearance due to the differential flow in the mold, which further oriented the mica particles along the lines separating domains. Lighter areas tend to have more mica aligned parallel to the surface, while darker areas tend to have mica that is at an angle to the surface.

Example 3

This example describes the preparation of a decorative surfacing material, which contains metal flake as an anisotropic orientable particle and alumina trihydrate as filler. The procedure of Example 1 was repeated except the following ingredients were used:

Weigh the following ingredients:
1120 grams ATH (alumina trihydrate) from Alcan
401 grams Paraloid® Latex K120ND [poly(methyl methacrylate/ethyl acrylate) polymer particle setting agent] from Rohm & Haas
6 grams Zinc Stearate
40 grams Edgemont Brilliant Orchid metal flake from Edgemont Metallic Pigments, Inc.
365 grams Methyl methacrylate (MMA)
58.3 grams Ethylene glycol dimethacrylate (EGDMA)
6.98 grams Luperox® 575 thermal initiator from Atofina
1.14 grams Vazo® 67, 2,2'-azobis(methylbutyronitrile) thermal initiator from DuPont
1.68 Zelec® MO coupling agent from DuPont The part as molded has a very thin surface layer of metal flake which is highly oriented parallel to the surface of the part. When lightly sanded a surface representative of the bulk of the material was revealed.

The resulting part is an attractive lavender color with an obvious visual texture. There are many fine lines separating regions of similar colors. Within the individual regions of a single color there are also slight variations in color.

Example 4

This example describes the preparation of a decorative surfacing material, which contains polymer ribbon as an anisotropic orientable particle and alumina trihydrate as filler. The procedure of Example 1 was repeated except the following ingredients were used:

Weigh the following ingredients:
1140 grams ATH (alumina trihydrate) from Alcan
405 grams Paraloid® Latex K120ND [poly(methyl methacrylate/ethyl acrylate) polymer particle setting agent] from Rohm & Haas
6 grams Zinc Stearate
20 grams Violette Crystalina Angelina Fibers from Meadowbrook Inventions, Inc
358 grams Methyl methacrylate (MMA)
57.2 grams Ethylene glycol dimethacrylate (EGDMA)
6.85 grams Luperox® 575 thermal initiator from Atofina
1.12 grams Vazo® 67, 2,2'-azobis(methylbutyronitrile) thermal initiator from DuPont
1.71 Zelec® MO coupling agent from DuPont The resulting part is black with individually distinct ribbons in shades of gold, silver, and purple. The ribbons appear to have broken down in processing so that the longest ribbons are less than 0.25" in length. Small regions within the plaque have similar orientations of the ribbons, with the orientations ranging from parallel to the surface to perpendicular.

Example 5

This example describes the preparation of a polyester resin based decorative surfacing material, which contains mica as an anisotropic orientable particle and alumina trihydrate as filler.

Formulation Preparation

Weigh the following ingredients:
325 grams ATH (alumina trihydrate) from Alcan
7.5 grams Calcium Hydroxide Powder
7.5 grams Zinc Stearate
10 grams Afflair® GP Green WRII Mica
148.5 grams McWhorter 748-3645 ortho-polyester resin
1 grams Luperox® 11M75 thermal initiator from Atofina
0.5 grams Vazo® 67, 2,2'-azobis(methylbutyronitrile) thermal initiator from DuPont Liquid Premix A liquid premix is prepared by combining the polyester resin and initiators and mixing until the initiators have dissolved.

Dry Blending

Blend the ATH, mica, zinc stearate, and calcium hydroxide thoroughly.

Compounding

The solids were poured into the liquids, mixed and kneaded until the mixture was homogenous.

Preparation of Mold Charge

Rest Period

The molding formulation from the previous step is allowed to rest for three hours. At this point the formulation was stiff.

Fragment Formation

The material was then pressed into a 3/8" thick sheet and cut into 3/8" cubes.

Molding 468 grams of the fragments from the previous step were poured into an 8"×8" plaque mold (preheated to 122° C.). The fragments were evenly distributed in the mold. The mold was closed and the following pressure profile applied.

| Time (min) | Pressure (psig) | Pressure (bar) |
|---|---|---|
| 0.0 | 469 | 31.5 |
| 0.5 | 547 | 36.7 |
| 1.0 | 625 | 42.0 |
| 2.0 | 703 | 47.0 |
| 2.5 | 781 | 52.5 |
| 3.0 | 1,250 | 83.9 |
| 8.0 | 1,250 | 83.9 |

The resulting part was green with an obvious visual texture, with many fine lines separating domains. Within the individual regions of a single color there are also slight variations in color.

Example 6

This example describes the preparation of a decorative surfacing material, which contains an extremely low amount, 0.01% by weight, of mica as an anisotropic orientable particle in an otherwise clear matrix. The procedure of Example 2 was repeated except the following ingredients were used:

Weigh the following ingredients:
1390 grams Elvacite® poly(methyl methacrylate) from ICI Acrylics
100 grams Paraloid® Latex K120ND from Rohm & Haas
6 grams Zinc Stearate
0.2 grams mica Afflair® 9605 Blue Shade Silver
426 grams MMA
68.2 grams EGDMA
8.1561 grams Luperox® 575
1.33 grams Vazo® 67

The resulting sample was translucent with a slight blue shade. The delineations between the originally separate fragments were only slightly apparent when the sample was illuminated from the surface being viewed, but were readily apparent when the sample was illuminated from behind. This delineation at the former interface appears darker than the bulk of the material. When illuminated from behind, variations in color among the formerly individual fragments may be seen.

Example 7

This example describes the preparation of a decorative surfacing material by coating charge fragments with a polymerizable solution containing mica. Two formulations were made independently for later combination. They were later partially mixed together to form a marbleized single formulation with swirls of color. This formulation was broken up into individual charge fragments that were coated with the mica containing solution.

Formulation Preparation for Two Formulations for Blending
Weigh the following ingredients:
2600 grams ATH (alumina trihydrate) from Nippon Light Metals
646 grams Paraloid® LATEX K120ND (poly(methyl methacrylate/ethyl acrylate) polymer particle setting agent) from Rohm & Haas
12 grams Zinc Stearate
528 grams Methyl methacrylate (MMA)
68.64 grams Ethylene glycol dimethacrylate (EGDMA)
6.92 grams Luperox® 575 (t-Amyl peroxy-2-ethyl hexanoate) thermal initiator from Atofina
7.39 grams Vazo® 67, 2,2'-azobis(methylbutyronitrile) thermal initiator from DuPont
3.9 grams Zelec® MO coupling agent from DuPont
80 grams Sartomer CN966J75 aliphatic urethane acrylate from Sartomer Co.
53.24 grams pigment dispersion (Zinc Sulfide $1^{st}$ batch, Carbon Black $2^{nd}$ batch)

Liquid Premix

A liquid premix is prepared by combining the MMA, EGDMA, Sartomer CN966J75 and Zelec® MO in a small vessel and mixing them with an impeller driven by an air motor for 2 minutes to mix them evenly:

Luperox® 575 and Vazo® 67 are then added and mixed for 10 minutes to mix fully and ensure the Vazo® 67 is fully dissolved.

Dry Blending

A mixture of the solids was then prepared by dry blending the ATH, Paraloid®, and Zinc Stearate in a Teledyne-Readco Double Sigma mixer. The ingredients were blended for 5 minutes.

Compounding

The premixed liquids were added to the premixed solids in the double sigma mixer. They were then compounded for six minutes. (In a separate procedure the above steps were repeated using the carbon black pigment dispersion.)

Preparation of Mold Charge

Marbleizing

The formulations were divided into two portions, one 2/3 white, 1/3 black and the other 2/3 black, 1/3 white. Each of these mixtures was compounded in the double sigma mixer for 50 revolutions at 50 rpm. This created two marbleized formulations, which were divided into individual fragment charges.

Coating Preparation
Mix the following by hand
76 grams of a 24% PMMA, 76% MMA solution
50 grams Sartomer CN966J75
1.5 grams Luperox® 575 (t-Amyl peroxy-2-ethyl hexanoate) thermal initiator from Atofina
0.4 grams Vazo® 67, 2,2'-azobis(methylbutyronitrile) thermal initiator from DuPont
4 grams white mica
2 grams gold mica Coating Compound 2200 grams of each marbleized formulation fragments were placed in the double sigma mixer. The material was mixed at 25 rpm while the coating solution was added. The charge fragments became coated with the coating solution.

Molding 900 grams of the fragments from the previous step were poured into an 8"×8" plaque mold (preheated to 122° C.). The fragments were evenly distributed in the mold. The mold was closed and 1480 psig (102 bar) pressure was applied for 8 minutes to cure the part. With the application of pressure and heat the surfaces of the fragments in the heated mold fused together and the formulation cured to give a solid surface part. The mold was then opened and the part removed.

The part as molded has a very thin surface layer of mica which is highly oriented parallel to the surface of the part. When lightly sanded a surface representative of the bulk of the material was revealed.

The resulting part had a combination of predominately white or black areas with striations of the opposite color. There were clear, mica containing veins separating the boundaries of the formerly separate charge fragments.

What is claimed is:

1. A process for making a surfacing material having a decorative pattern which comprises preparing a mixture of a flowable thermosettable molding formulation and orientable anisotropic aesthetic-enhancement particles, said particles having an aspect ratio of at least 3, mixing the particles and said molding formulation to orient at least some of the particles along lines of flow of the molding formulation during mixing, further orienting said particles by dividing the resulting mixture into charge fragments, and forming a multiplicity of domains of the mixture in which interfaces of adjacent domains exhibit shading variations along their interfaces by feeding the charge fragments into a hot mold, and fusing adjacent surfaces of the fragments by applying heat and pressure.

2. The process of claim 1 wherein the anisotropic aesthetic-enhancement particles are plate having three dimensions, two of said dimensions being larger than a third dimension.

3. The process of claim 1 wherein the anisotropic aesthetic-enhancement particles are fiber, having three dimensions, one of said dimensions being larger than the other two dimensions.

4. The process of claim 1 wherein the anisotropic aesthetic-enhancement particles are ribbon, having three dimensions, one of said dimensions being larger than the other two dimensions, the second dimension being large enough relative to the third dimension that it is visibly distinguishable.

5. The process of claim 2 where the plate particles are selected from the group consisting of mica, synthetic mica, glass, metal flake, alumina, silica, polymer flake, ceramic, synthetic colorant, and combinations thereof.

6. The process of claim 3 where the fiber particles are selected from the group consisting of glass, metal, carbon, ceramic, polymer, natural fibers and combinations thereof.

7. The process of claim 4 where the ribbon particles are selected from the group consisting of glass, metal, carbon, ceramic, polymer ribbons and combinations thereof.

8. The process of claim 1 wherein said molding formulation contains a thermosettable acrylic component and the anisotropic particles are mica.

9. The process of claim 1 wherein said molding formulation contains a thermosettable resin selected from the group consisting of thermosettable polyester, epoxy, urethane, acrylo-urethane, and melamine resin and combinations thereof.

10. The process of claim 1 wherein a finely divided filler with an aspect ratio less than three is mixed with the formulation.

11. The process of claim 10 wherein the finely divided filler is selected from the group consisting of alumina trihydrate, calcium carbonate, silica, alumina, barium sulfate, alumina monohydrate, aluminum hydroxide, aluminum oxide, aluminum sulfate, aluminum phosphate, aluminum silicate, Bayer hydrate, borosilicates, calcium sulfate, calcium silicate, calcium phosphate, calcium carbonate, calcium hydroxide, calcium oxide, apatite, glass bubbles, glass microspheres, glass fibers, glass beads, glass flakes, glass powder, glass spheres, barium carbonate, barium hydroxide, barium oxide, barium sulfate, barium phosphate, barium silicate, magnesium sulfate, magnesium silicate, magnesium phosphate, magnesium hydroxide, magnesium oxide, kaolin, montmorillonite, bentonite, pyrophyllite, mica, gypsum, silica, ceramic microspheres, ceramic particles, and ceramic whiskers, powder talc, titanium dioxide, diatomaceous earth, wood flour, borax, and combinations thereof.

12. The process of claim 10 wherein the finely divided filler is alumina trihydrate.

13. The process of claim 1 wherein one or more additional molding formulations are blended with said flowable thermosettable molding formulation.

14. The process of claim 1 wherein the charge fragments are coated with a colorant.

\* \* \* \* \*